United States Patent [19]
Williams et al.

[11] Patent Number: 5,491,831
[45] Date of Patent: Feb. 13, 1996

[54] CELLULAR MOTOR CONTROL NETWORK

[75] Inventors: Gregory L. Williams, Scottsdale; William C. Roman, Tempe, both of Ariz.

[73] Assignee: Motorola, Schaumburg, Ill.

[21] Appl. No.: 59,555

[22] Filed: May 10, 1993

[51] Int. Cl.⁶ ...................................................... H04B 7/00
[52] U.S. Cl. ......................... 455/33.1; 455/38.1; 455/66; 340/825.69; 340/825.72
[58] Field of Search ............................... 455/66, 33.1, 70, 455/71, 186.1, 38.1, 53.1; 340/825.69, 825.72

[56] References Cited

U.S. PATENT DOCUMENTS

| | | |
|---|---|---|
| 4,593,155 | 6/1986 | Hawkins . |
| 5,140,308 | 8/1992 | Tanaka . |
| 5,146,153 | 9/1992 | Luchaco et al. .................... 340/825.69 |
| 5,159,625 | 10/1992 | Zicker . |
| 5,168,202 | 12/1992 | Bradshaw et al. ...................... 318/608 |
| 5,266,922 | 11/1993 | Smith et al. . |
| 5,276,728 | 1/1994 | Pagliaroli et al. ..................... 455/54.2 |
| 5,327,478 | 7/1994 | Lebowitz . |
| 5,335,361 | 8/1994 | Ghaem ................................... 455/66 |

*Primary Examiner*—Edward F. Urban
*Attorney, Agent, or Firm*—Eugene A. Parsons

[57] ABSTRACT

A cellular motor control network including a service center and a plurality of local cell controllers in communication with the service center, with each of the plurality of local cell controllers having a plurality of cellular motor controls in communication therewith. Each cellular motor control coupled to a variable speed electric motor. The cellular motor control including control circuits for controlling the operation of the variable speed electric motor, a microprocessor coupled to the control circuits for providing a predetermined control program, and a transceiver coupled to the microprocessor for communicating information between the microprocessor and other control units in the network.

25 Claims, 6 Drawing Sheets

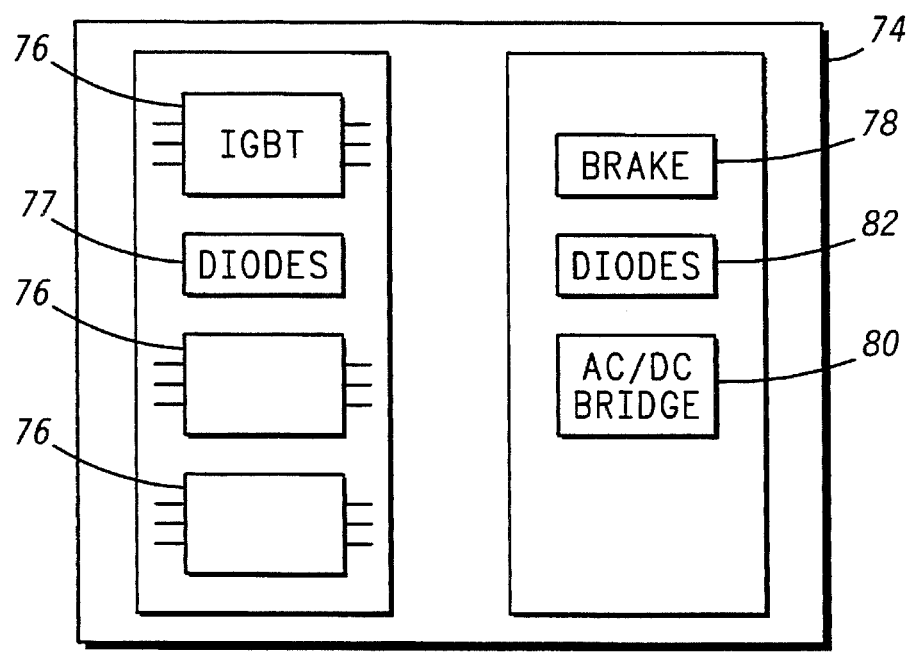
*FIG. 5*
*FIG. 6*
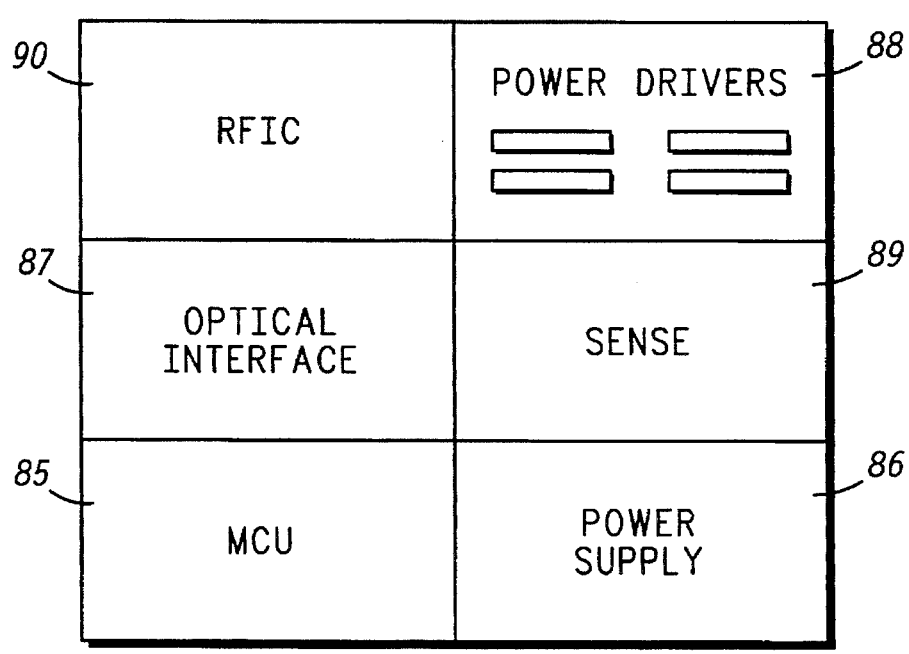

CELLULAR MOTOR CONTROL NETWORK

FIELD OF THE INVENTION

The present invention pertains to motor controls and more specifically to motor controls included in a cellular communications network.

BACKGROUND OF THE INVENTION

The world in increasingly using electric motors for power transfer. Motors use electrical energy generated, at times, from fossil fuels and nuclear energy sources. As global efforts continue to optimize the rate and efficiency of power supply, so will increasing efforts to improve the efficiency of power demand. Power quality in demand will not only be dependent upon switching efficiency, speed and protection; but also upon flexibility in applying power control systems.

At the present time, electrical motors in large systems, such as assembly lines in large manufacturing plants, etc. are hardwired into the system. Each time there is a need to change the assembly line the entire line must be shut down while motors are removed and rewired at a different location. Further, these wires have a tendency to wear and become entangled so that rewiring is often necessary and very difficult. In fact, the highest single defect mechanism from today's industrial networks is the electrical wiring.

In addition to this wiring problem, electrical motors have a tendency to wear and apparatus to which they are attached also wears. When a motor finally burns out, because of a defect in the motor itself or in the apparatus being controlled by the motor, the apparatus must be shut down for repair and, in some cases rebuilding. Also, in many systems all motors may depend upon each of the other motors, such as in a pumping system, assembly lines, etc. In these systems the motors are timed to operate together and if one motor burns out, or is reduced in speed, the remaining motors, or the system, can be endangered. If defects and pending breakdowns can be predicted, the shut down time can often be minimized.

SUMMARY OF THE INVENTION

It is a purpose of the present invention to provide a new and improved cellular motor control network.

It is a further purpose of the present invention to provide a new and improved cellular motor control network which does not require hard wiring for the control of motors therein.

It is a still further purpose of the present invention to provide a new and improved cellular motor control network in which the installation and repositioning of motors is relatively easy.

It is also a purpose of the present invention to provide a new and improved cellular motor control network in which breakdowns and the like can generally be predicted.

It is a further purpose of the present invention to provide a new and improved cellular motor control network which includes inter-motor control for extra system protection.

The above problems and others are substantially solved and the above purposes and others are realized in a cellular motor control network including a cellular motor control having control means for controlling the operation of an electric motor, a microprocessor coupled to the control means for providing a predetermined control program, and a transceiver coupled to the microprocessor for communicating information between the microprocessor and remotely located control units.

The above problems and others are substantially solved and the above purposes and others are realized in a cellular motor control network including a service center, a plurality of local cell controllers in communication with the service center and each of the plurality of local cell controllers having a plurality of cellular motor controls in communication therewith, each of the cellular motor controls having control means for controlling an electric motor, a microprocessor coupled to the control means for providing a predetermined control program, and a transceiver coupled to the microprocessor for communicating information between the microprocessor and remotely located control units, each local cell controller being located remotely from at least some of the plurality of cellular motor controls and including a cell controller transceiver designed to communicate with the transceivers in each of the cellular motor controls and a cell controller microprocessor coupled to the cell controller transceiver for supplying control signals to the cell controller transceiver and receiving data signals from the cell controller transceiver, and the service center including a service transceiver designed to communicate with the cell controller transceivers in each of the local cell controllers and a service microprocessor coupled to the service transceiver for supplying control signals to the service transceiver and receiving data signals from the service transceiver.

BRIEF DESCRIPTION OF THE DRAWINGS

Referring to the drawings:

FIGS. 5 and 6 are views in top plan of different portions of the structure illustrated in FIG. 4;

DESCRIPTION OF THE PREFERRED EMBODIMENT

Figure 1:
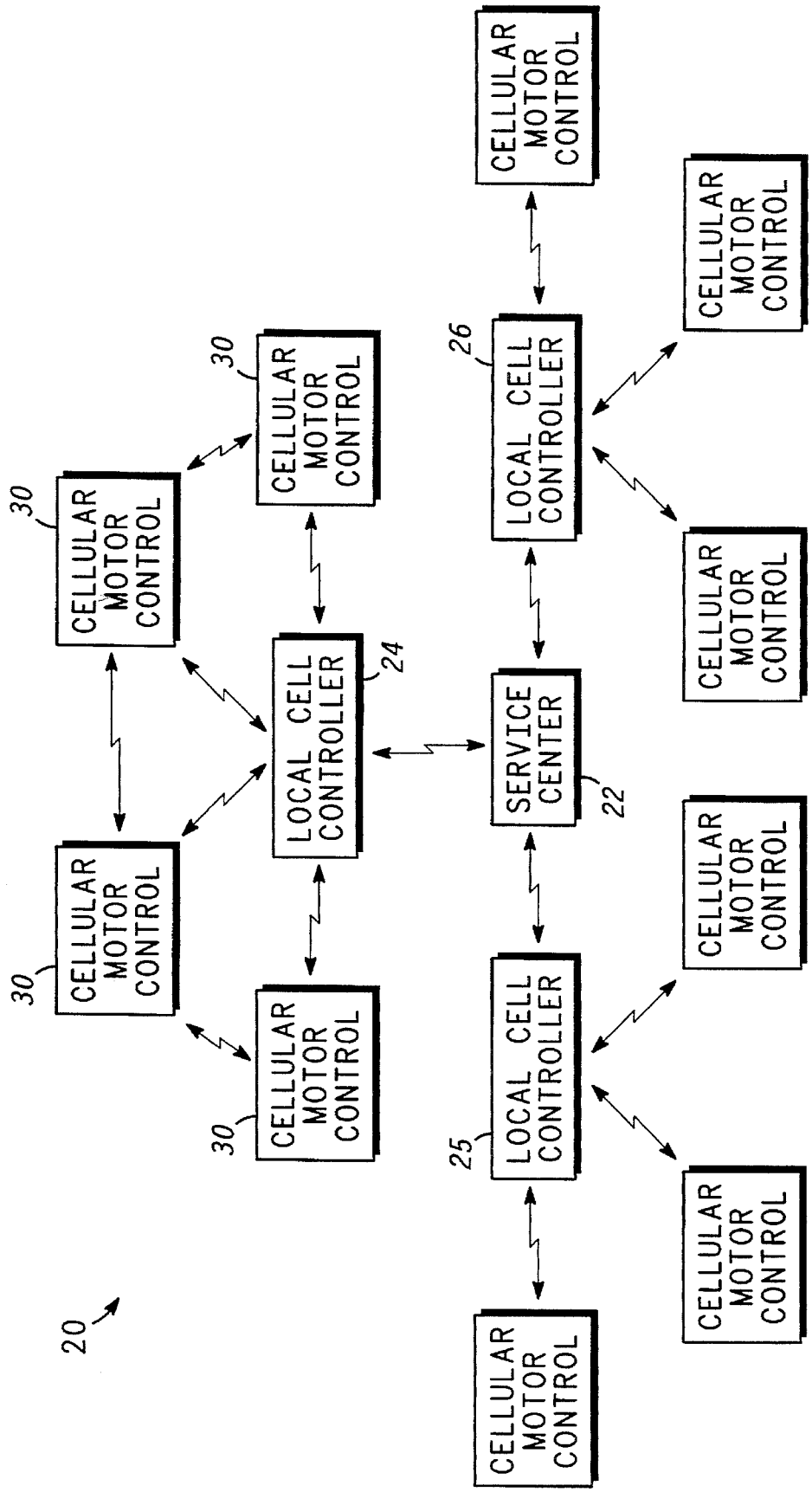
FIG. 1 is a block diagram of a cellular motor control network embodying the present invention.

Referring specifically to FIG. 1, a block diagram of a cellular motor control network 20 embodying the present invention is illustrated. Network 20 includes a service center 22 and a plurality of local cell controllers 24, 25 and 26. Each local cell controller 24, 25 and 26 has associated therewith a plurality of cellular motor controls 30. As will be explained in more detail presently, generally, service center 22 is capable of communicating with any of local cell controllers 24, 25 and 26, each local cell controller 24, 25 and 26 is capable of communicating with each cellular motor control 30 associated therewith, and each cellular motor control 30 is capable of communicating with other cellular motor controls 30 associated with the same local cell controller 24, 25, or 26. However, it should be understood that in specific applications communications between other units in the network can be programmed into the network, e.g., communications between local cell controllers 24, 25 and 26, etc. In conjunction with network 20, it should further be understood that the term 'communications', or 'communicating' with a unit, includes transmitting signals to and receiving signals from the unit.

Figure 2:
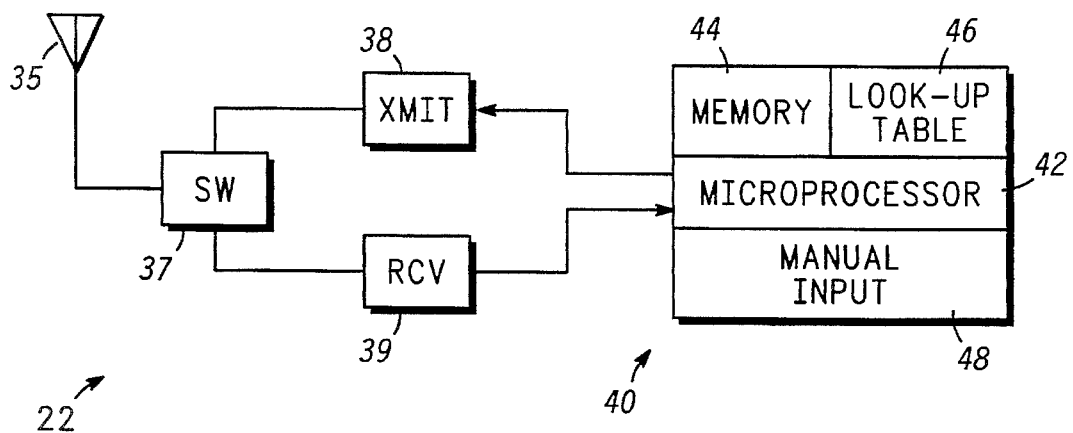
FIG. 2 is a simplified block diagram of a portion of the network of FIG. 1.

Referring specifically to FIG. 2, a somewhat simplified block diagram of service center 22 is illustrated. Service center 22 includes an omni-directional communications antenna 35 electrically coupled through a transmit/receive switch 37 to either a transmitter 38 or a receiver 39. A control unit 40 includes a microprocessor 42, additional memory 44 in the form of ROMs, RAMs, floppy disk, or other memory, a look-up table 46 and manual inputs or controls 48. Control unit 40 provides signals to transmitter 38 for transmitting to other control units and receives signals through receiver 39 from other control units, specifically local cell controllers 24, 25 and 26 in this embodiment.

Figure 3:
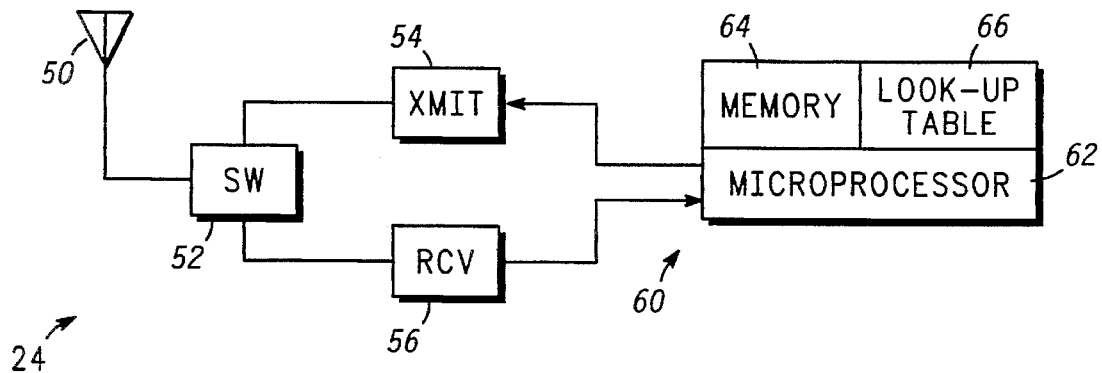
FIG. 3 is a simplified block diagram of another portion of the network of FIG. 1.

Referring specifically to FIG. 3, a somewhat simplified block diagram of local cell controller 24 is illustrated. It should be understood that in this specific embodiment all local cell controllers 24, 25 and 26 are similar and local cell controller 24 is being used for detailed explanation only for convenience. Local cell controller 24 includes an omni-directional communications antenna 50 electrically coupled through a transmit/receive switch 52 to either a transmitter 54 or a receiver 56. A control unit 60 includes a microprocessor 62, additional memory 64 in the form of ROMs, RAMs, floppy disk, or other memory and a look-up table 66. Control unit 60 provides signals to transmitter 54 for transmitting to other control units and receives signals through receiver 56 from other control units, specifically, in this embodiment, service center 22 and cellular motor controls 30 associated therewith.

Figure 4:
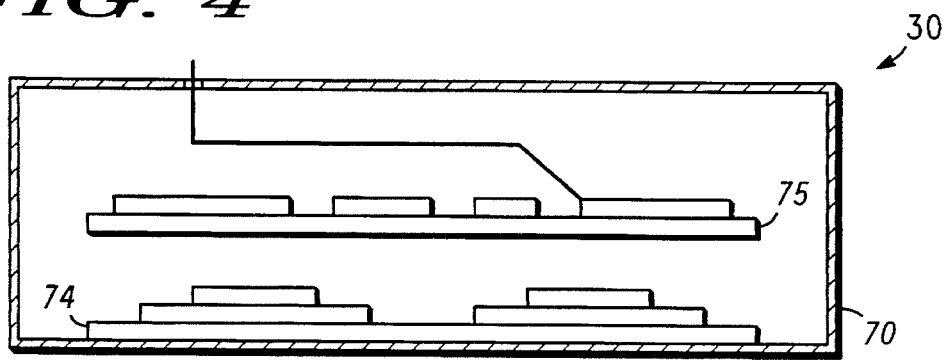
FIG. 4 is a view in side elevation of another portion of the network of FIG. 1.
Figure 7:
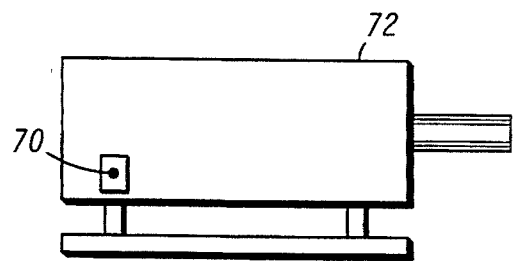
FIG. 7 is a view in side elevation of the structure of FIG. 4 mounted on an electric motor.

One of the cellular motor controls 30 associated with local cell controller 24 is illustrated in more detail in FIGS. 4–6. Cellular motor control 30 is packaged in a module 70, in this embodiment, which module 70 is designed to be mounted directly on an electric motor, such as variable speed, multi-phase electric motor 72 illustrated in FIG. 7. It should be understood that in other embodiments cellular control 30 may be packaged differently and attached to an electric motor differently as, for example, it may be mounted inside the motor housing. Module 70 includes two mounting boards 74 and 75 mounted in spaced relationship to eliminate the possibility of inter-action therebetween, as will be explained in more detail presently.

Referring specifically to FIG. 5, board 74 includes three power semiconductor devices 76, which in this specific embodiment are insulated gate bipolar transistors packaged in thermally efficient, multi-chip modules. Each device 76 is designed to receive power from an external source and provide one phase of power to multi-phase electric motor 72. Further, devices 76 are controllable to provide the power at a variable frequency, for example from 1 cycle to 20 KHz. Photodetector and light emitting diodes 77 are mounted on board 74 and coupled to devices 76 for supplying control signals from board 75 and information to board 75. Also, board 74 has a second substrate with an electronic brake 78 and an ac/dc bridge circuit mounted thereon. Photodetector and light emitting diodes 82 are also mounted on the second substrate to communicate signals to brake 78 and bridge 80. It will of course be understood that other devices for performing other and/or additional functions may be mounted on board 74.

Board 75, illustrated in more detail in FIG. 6, includes a microprocessor 85 preprogrammed to control motor 72 to perform the specific tasks of the particular application. A power supply 86 is designed to provide the power required for the various components mounted on board 75. An optical interface 87 is provided for communicating with diodes 76 and 82 on board 74. In this specific embodiment communications between boards 74 and 75 are performed optically to provide an electrically safe spacing between boards 74 and 75 so that the relatively high voltages (several hundred volts) present on board 74 cannot inadvertently be shorted, or otherwise applied, to any of the low voltage components (5 volts or less) on board 75. Microprocessor 85 controls the speed of motor 72 by supplying control and/or clock signals to power drivers 88, which in turn supply the required variable frequency signals to devices 76. Also, a sense module 89 is provided on board 75 which module may contain some of the actual sensors (depending upon the statistic being sensed) or may simply contain sense amplifiers for sensors mounted on motor 72 (as in the case of a heat sensor).

Figure 8:
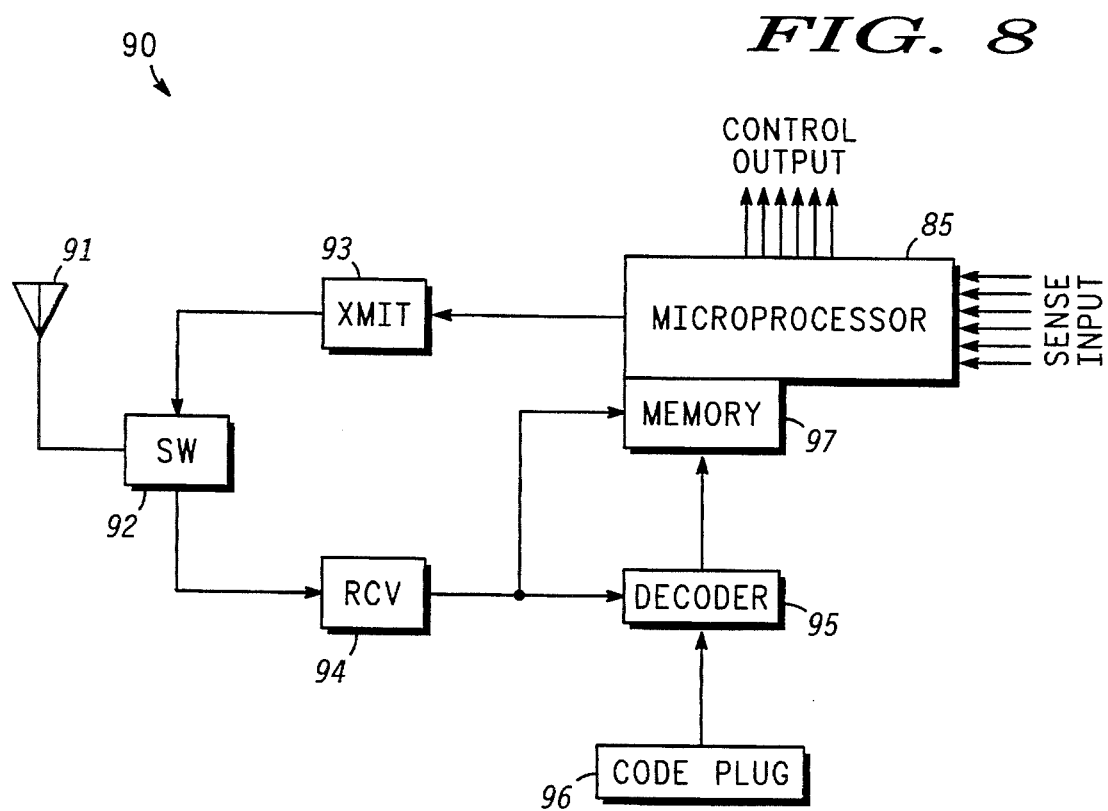
FIG. 8 is a simplified block diagram of a portion of the structure illustrated in FIG. 6.

Board 75 further includes an RF interface integrated chip (RFIC) 90, a simplified block diagram of which is illustrated in FIG. 8. RFIC 90 includes an omni-directional communications antenna 91 coupled through a transmit/receive switch 92 to either a transmitter 93 or a receiver 94. Transmitter 93 has an input for receiving various signals from microprocessor 85, which it then transmits to a designated remote unit, such as another cellular motor control 30 or local cell controller 24. Receiver 94 is designed to respond only to a unique address pre-assigned to each cellular motor control 30. In this embodiment this is accomplished by means of a decoder 95 and code plug 96, which contains the unique address for this specific cellular motor control.

When a message is received by receiver 94, any data is preceded by the unique address of the specific cellular motor control for which the data is intended. The address is coupled to decoder 95 where it is compared to the address stored in code plug 96. If the addresses match, the data following the address is coupled to a memory 97 where it is stored for processing by microprocessor 85. It will of course be understood that a similar address system can be used for other components in the network 20, including service center 22 and local cell controllers 24, 25 and 26, if desired, and/or a system of unique frequencies can be utilized in which only transmitters and receivers tuned to a specific frequency can transmit and receive the specific signals.

Microprocessor 85 is coupled to sense module 89 through a plurality of sense inputs and to various other components, including power drivers 88, through a plurality of control outputs. In a typical example of the operation of cellular motor control 30, a heat sensor on motor 72 supplies an indication, through sense module 89, to microprocessor 85 that motor 72 is overheating. Through a program stored therein, microprocessor 85 immediately reduces the speed of motor 72 to some safe value such as one half normal speed. Simultaneously, a signal is transmitted to local cell controller 24 apprising it of the overheating condition. A corresponding signal is transmitted to service center 22 where steps are taken to provide service to motor 72, and/or bring a redundant motor or path (depending upon the application) on line. By automatically reducing the speed of motor 72 the entire system does not have to be shut down and time can be gained for performing maintenance without excessive loss of output.

In systems where the speed of motor 72 effects other motors in the system, signals may also be sent to other cellular motor controls 30 instructing them to reduce the speed of motors coupled thereto. Other information shared between cellular motor controls 30 may be, for example, inter-motor instruction sets, load information, work load arrivals, etc. In this way, cellular motor controls 30, or local cell controllers 24, 25, or 26, can schedule material movement. In some systems local cell controllers 24, 25 and 26 will collect and store performance information from each associated cellular motor controller 30, and also energy demand data. Local cell controllers 24, 25 and 26 can then be polled by service center 22 for the stored data. Service center 22, or operators at the center, can use this data for more efficient operation of network 20 and to pro-actively schedule and execute preventive maintenance, etc. In this way pending component breakdowns and consequent system stoppage can be reduced or eliminated.

Thus, microprocessor 42 in service center 22, microprocessor 62 in each of local cell controllers 24, 25 and 26, and microprocessor 85 in each of cellular motor controls 30 communicate through the RF link of network 22 to provide a complete control system. Each, or any, of the microprocessors can incorporate advanced microprocessor control through digital signal processing, fuzzy logic, etc. Further, each cellular motor control 30 and, hence, each electric motor has a unique address so that each electric motor can be individually controlled in accordance with the specific network operation. In addition, in this specific embodiment each cellular motor control 30 is programmed to respond to each command received so that local cell controllers 24, 25 and 26 and service center 22 know that the commands have been received and performed. Typical acknowledge signals of this type are disclosed in U.S. Pat. No. 4,811,379, issued Mar. 7, 1989 and entitled "Speak Back Paging System" and U.S. Pat. No. 4,825,193, issued Apr. 25, 1989, entitled "Acknowledge Back Pager With Adaptive Variable Transmitter Power". Also, by including electrically erasable PROMs or the like in the memories coupled to the various microprocessors, reprogramming can be performed from service center 22, and/or local cell controllers 24, 25 and 26 to incorporate changes in operation, temporary fixes of problems, upgrades, etc. Typical reprogramming can be performed in accordance with, for example, the disclosure set forth in U.S. Pat. No. 4,910,510, issued Mar. 20, 1990, entitled "System for Off-the-Air Reprogramming of Communication Receivers" and assigned to the same assignee.

Figure 9:
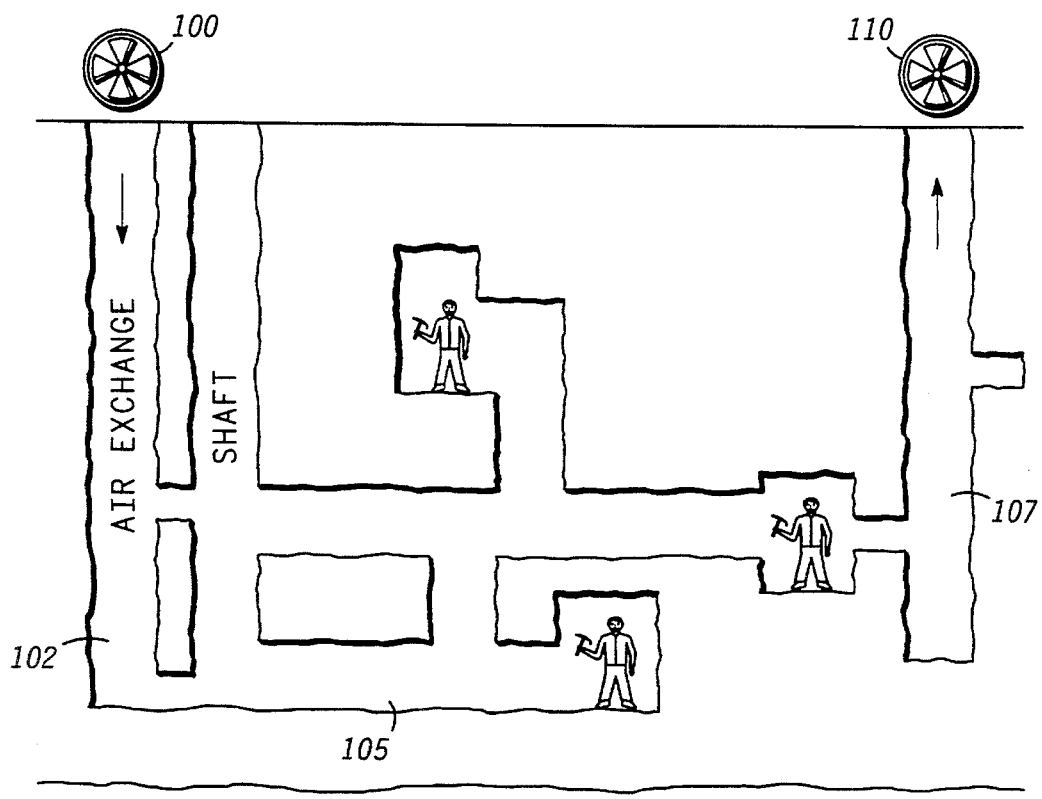
FIGS. 9 to 12 are simplified drawings illustrating different embodiments and applications of networks similar to that illustrated in FIG. 1.

Several specific applications of systems similar to network 20 are illustrated in FIGS. 9–12. Referring to FIG. 9, a simplified mine ventilation system is illustrated in which a fan 100 forces fresh air into an air exchange shaft 102, which is opened at specific locations to a main mine shaft 105 to supply fresh air thereto. Stale or used air is exhausted through an exhaust shaft 107 and an exhaust motor 110. It will immediately be noted that both fans 100 and 110 should operate together and at approximately the same speed for maximum efficiency and safety. If, for example one of fans 100 or 110 overheat, the speed can be reduced, as described above, and the speed of the other fan can also be reduced. This will continue to supply sufficient fresh air for some continued operations until service or an alternate source can be provided.

Figure 10:
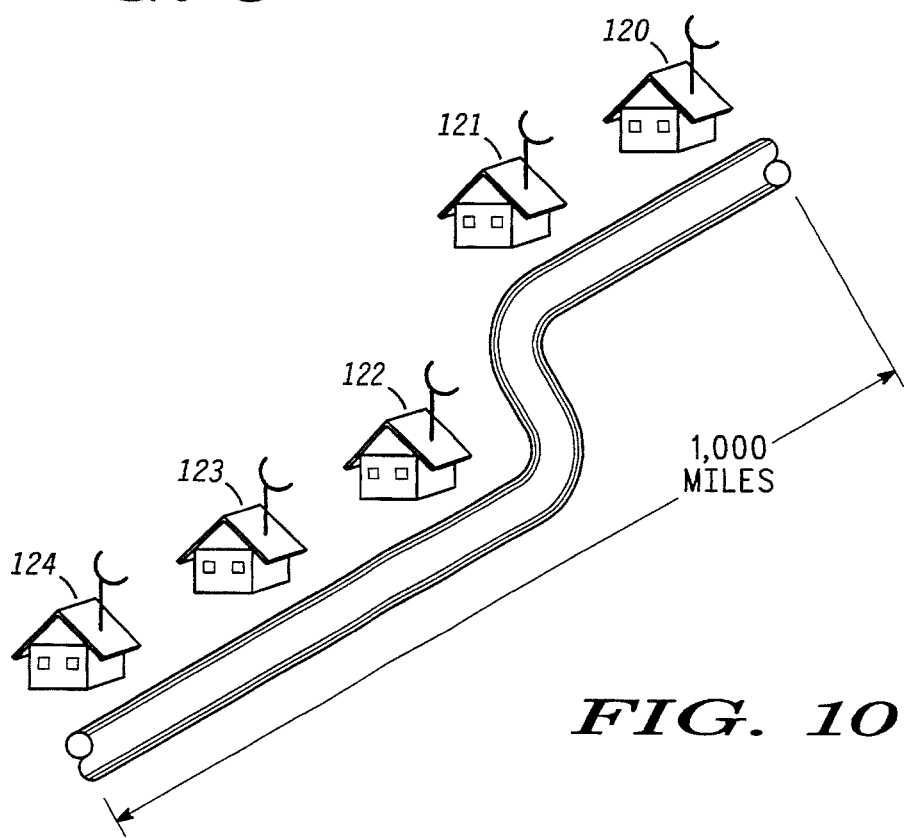

Referring to FIG. 10, a diagram of a simplified oil pipe line utilizing a system similar to network 20 is illustrated. In this system, because of the relatively long distances, communications between pump stations 120–124 is accomplished by utilizing satellites, such as those in the Iridium communications system (Iridium is a trademark of MOTOROLA, Inc.) or the Global Positioning System (GPS). Here it should be noted that timing and position can also be obtained from the GPS, for example, to ensure that all of the pumping stations 120–124 are synchronized for maximum efficiency. In this system one pump station could also incorporate all of the functions of the local cell controller and/or the service center. Further, because the pumping stations 120–124 communicate through a satellite, a service center or similar data gathering unit can be established at any convenient location, such as the manufacturer's or operator's offices. In this way, continuous data can be gathered for present preventive maintenance and for future modifications and improvements. Similar networks can be utilized in other systems on land, sea, or air.

Figure 11:
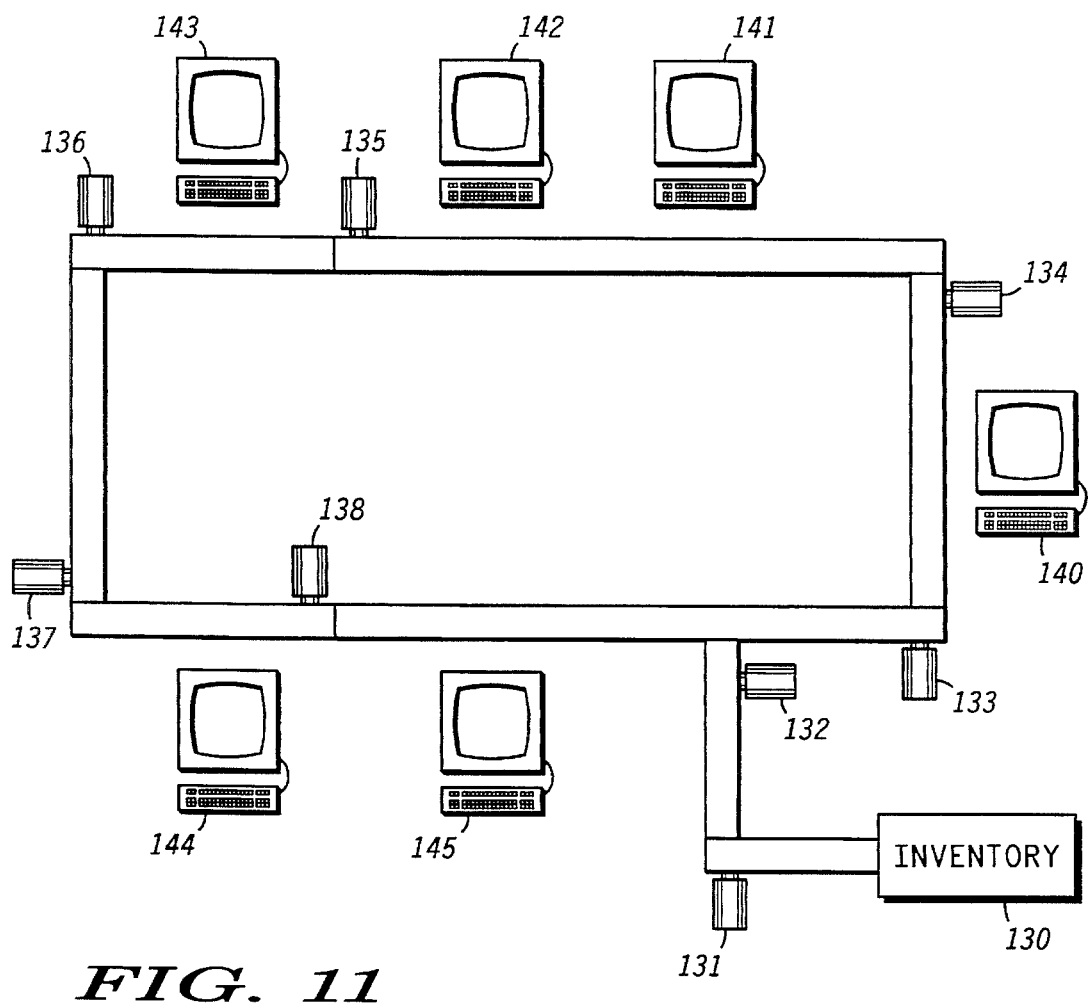

Referring to FIG. 11, a diagram of a simplified factory conveyor system is illustrated. In this system, raw materials or supplies are loaded onto the conveyor system at an inventory position 130. Variable speed motors 131–138 then drive the conveyor system past the various work stations 140–145. In the specific embodiment illustrated, each motor 131–138 drives a different section of the conveyor system and it is essential that all of the motors work together or the entire assembly line can be shut down. Further, by individual control of each motor 131–138, the flow of the conveyor system can be modified at any time. A service center or local cell controller in communication with all of motors 131–138 stores performance information from each motor 131–138 and, hence, work stations 140–145 for the network and pro-actively schedules and executes preventive maintenance on all of the network. Also, diagnostics can be performed continuously, or at desired periods, on the system and all of the motors 131–138 so that break-downs and the like can be reduced and/or eliminated. All motors equipped with cellular motor controls can be installed or relocated without physically wiring the work environment. This results in much shorter implementation of manufacturing process strategy and changes, and system reliability.

Figure 12:
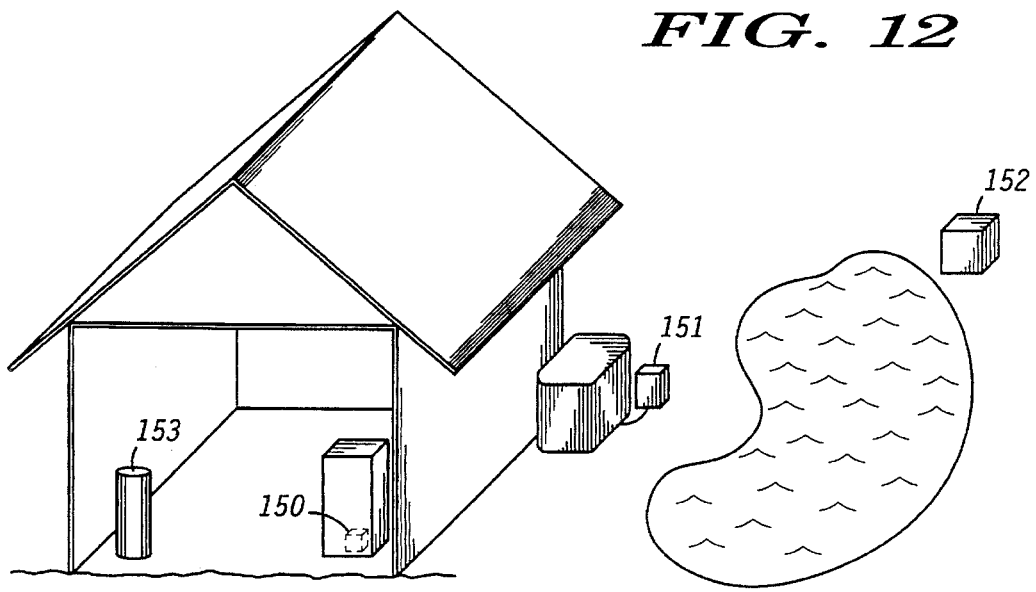

Referring to FIG. 12, a simplified network similar to network 20 is illustrated incorporated into a home. In this system each motor, such as refrigerator motor 150, air conditioning motor 151, pool circulation motor 152 and the heating elements in a hot water heater 153 includes a cellular motor control, all of which are in communication with a standard load controller (not shown) or a local cell controller programmed to operate as a load controller. Thus, motor operation and/or speed can be controlled on a priority basis. Further, pending appliance defects or an improved energy consumption strategy is pro-actively shared with the homeowner.

Thus, several embodiments of a new and improved cellular motor control network have been disclosed which greatly increase the energy efficiency of electric motor applications. Further, the new and improved cellular motor control networks do not require hard wiring for the control of motors therein so that the installation and repositioning of motors is relatively easy. Also, the new and improved cellular motor control networks provide inter-motor control for extra system protection and means in which breakdowns and the like can generally be predicted.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A cellular motor control network comprising a plurality of cellular motor controls, each designed for communicating with other cellular motor controls in the network, each cellular motor control including an electric motor, control means for controlling the operation of the electric motor, a microprocessor coupled to the control means for providing a predetermined control program, and a wireless transmitter/receiver coupled to the microprocessor for communicating information between the microprocessor and other cellular motor controls in the plurality of cellular motor controls and between the microprocessor and remotely located control units; and the remotely located control units each including a local cell controller located remotely from at least some of the plurality of cellular motor controls, the local cell controller including a cell controller wireless transmitter/receiver for transmitting control signals to the at least some of the plurality of cellular motor controls and for receiving data signals from the at least some of the plurality of cellular motor controls and a cell controller microprocessor coupled to the cell controller wireless transmitter/receiver for supplying the control signals to the cell controller wireless transmitter/receiver and receiving the data signals from the cell controller wireless transmitter/receiver.

2. A cellular motor control network as claimed in claim 1 wherein the control means includes a plurality of power semiconductor devices designed to be coupled to a source of power and to supply power to a controlled electric motor.

3. A cellular motor control network as claimed in claim 1 wherein the wireless transmitter/receiver of each cellular motor control includes means for responding to a unique address.

4. A cellular motor control network as claimed in claim 3 wherein the means in the wireless transmitter/receiver is remotely programmable.

5. A cellular motor control network as claimed in claim 1 wherein the wireless transmitters/receivers in each cellular motor control is further designed for transmission to and reception from satellites in a global positioning system.

6. A cellular motor control network as claimed in claim 1 wherein the wireless transmitters/receivers in each cellular motor control is further designed for transmission to and reception from satellites in a global telephone system.

7. A cellular motor control network as claimed in claim 1 wherein the local cell controller further includes a memory coupled to the cell controller wireless transmitter/receiver for storing data received from the cell controller wireless transmitter/receiver.

8. A cellular motor control network as claimed in claim 7 wherein the local cell controller further includes a look-up memory coupled to the cell controller microprocessor, which look-up memory includes information for reprogramming each cellular motor control.

9. A cellular motor control network as claimed in claim 1 including a plurality of local cell controllers each having a plurality of cellular motor controls associated therewith.

10. A cellular motor control network as claimed in claim 9 including in addition a service center located remotely from at least some of the plurality of local cell controllers, the service center including a service wireless transmitter/receiver designed to communicate with the cell controller transceivers in each of the local cell controllers and a service microprocessor coupled to the service wireless transmitter/receiver for supplying control signals to the service wireless transmitter/receiver and receiving data signals from the service wireless transmitter/receiver.

11. A cellular motor control network as claimed in claim 10 wherein the service center further includes a service memory coupled to the service wireless transmitter/receiver for storing data received from the service wireless transmitter/receiver.

12. A cellular motor control network as claimed in claim 11 wherein the service center further includes a service look-up memory coupled to the service microprocessor, which service look-up memory includes information for reprogramming each local cell controller and each cellular motor control associated with each local cell controller.

13. A cellular motor control network as claimed in claim 1 wherein the cellular motor control includes control means for controlling the speed of a three phase motor, the control means including three, power semiconductor circuits each connected to receive variable frequency signals from the microprocessor, the frequency of the variable frequency signals determining the speed of the three phase motor.

14. A cellular motor control network as claimed in claim 13 wherein the cellular motor control includes sensors for coupling to the motor and connected to the microprocessor.

15. A cellular motor control network as claimed in claim 14 wherein the cellular motor control includes heat sensors for coupling to the motor and connected to the microprocessor so as to cause the microprocessor to reduce the speed of the motor in response to a high heat signal from the heat sensor.

16. A cellular motor control network as claimed in claim 1 wherein each cellular motor control includes first and second mounting boards with the control means mounted on the first mounting board and the microprocessor and wireless transmitter/receiver mounted on the second mounting board.

17. A cellular motor control network as claimed in claim 16 wherein the first and second mounting boards are coupled together by means of an optical interface.

18. A cellular motor control network comprising a plurality of variable speed electric motors each having a cellular motor control coupled thereto, each of the cellular motor controls including control means for controlling the operation of the variable speed electric motor, a microprocessor coupled to the control means for providing a predetermined control program, and a wireless transmitter/receiver coupled to the microprocessor for communicating information between the microprocessor and remotely located control units; and the remotely located control units each including a local cell controller located remotely from at least some of the plurality of cellular motor controls, the local cell controller including a cell controller wireless transmitter/receiver to the at least some of the plurality of cellular motor controls and for receiving data signals from the at least some of the plurality of cellular motor controls and a cell controller microprocessor coupled to the cell controller wireless transmitter/receiver for supplying the control signals to the cell controller wireless transmitter/receiver and receiving the data signals from the cell controller wireless transmitter/receiver.

19. A cellular motor control network as claimed in claim 18 wherein the variable speed electric motor is a multiphase electric motor.

20. A cellular motor control network as claimed in claim 19 wherein the control means includes a power semiconductor circuit for each phase of the multiphase electric motor.

21. A cellular motor control network as claimed in claim 20 wherein the microprocessor is coupled to provide variable frequency signals to the power semiconductor circuits, the frequency of the variable frequency signals determining the speed of the three phase motor.

22. A cellular motor control network as claimed in claim 21 wherein the cellular motor control includes sensors coupled to the multiphase electric motor for sensing predetermined statistics of the multiphase electric motor, the sensors being electrically coupled to provide electrical signals indicative of the sensed statistics to the microprocessor.

23. A cellular motor control network as claimed in claim 22 wherein the sensors include a heat sensor coupled to the multiphase electric motor and connected to the microprocessor so as to cause the microprocessor to reduce the speed of the motor in response to a high heat signal from the heat sensor.

24. A cellular motor control network as claimed in claim 20 wherein the power semiconductor circuits are coupled to the microprocessor by an optical interface.

25. A cellular motor control network comprising:

a service center;

a plurality of local cell controllers in communication with the service center and each of the plurality of local cell controllers having a plurality of cellular motor controls in communication therewith;

each of the cellular motor controls having control means for controlling an electric motor, a microprocessor coupled to the control means for providing a predetermined control program, and a wireless transmitter/receiver coupled to the microprocessor for communicating information between the microprocessor and remotely located control units including the service center and other of the plurality of local cell controllers;

each local cell controller being located remotely from at least some of the plurality of cellular motor controls and including a cell controller wireless transmitter/receiver for transmitting control signals to the at least some of the plurality of cellular motor controls and for receiving data signals from the at least some of the plurality of cellular motor controls and a cell controller microprocessor coupled to the cell controller wireless transmitter/receiver for supplying the control signals to the cell controller wireless transmitter/receiver and receiving the data signals from the cell controller wireless transmitter/receiver; and the service center including a service wireless transmitter/receiver for transmitting control signals to the plurality of local cell controllers and for receiving data signals from the plurality of local cell controllers and a service microprocessor coupled to the service wireless transmitter/receiver for supplying the control signals to the service wireless transmitter/receiver and receiving the data signals from the service wireless transmitter/receiver.

* * * * *